United States Patent [19]
Morton et al.

[11] Patent Number: 6,067,311
[45] Date of Patent: May 23, 2000

[54] EXCIMER LASER WITH PULSE MULTIPLIER

[75] Inventors: Richard G. Morton, San Diego; William N. Partlo, Poway, both of Calif.

[73] Assignee: Cymer, Inc., San Diego, Calif.

[21] Appl. No.: 09/148,514

[22] Filed: Sep. 4, 1998

[51] Int. Cl.[7] .................................................... H01S 3/225
[52] U.S. Cl. ............................................. 372/57; 372/25
[58] Field of Search .................................. 372/25, 55–60

[56] References Cited

U.S. PATENT DOCUMENTS

| | | | |
|---|---|---|---|
| 3,430,048 | 2/1969 | Rubinstein | 250/199 |
| 3,447,856 | 6/1969 | Lange | 350/150 |
| 3,501,222 | 3/1970 | Herriott et al. | 350/171 |
| 3,845,294 | 10/1974 | Indig et al. | 359/129 |
| 4,511,220 | 4/1985 | Scully | 350/403 |
| 5,023,884 | 6/1991 | Akins et al. | 372/57 |
| 5,233,460 | 8/1993 | Partlo et al. | 350/247 |
| 5,891,605 | 4/1999 | Stanton | 430/296 |
| 5,936,988 | 8/1999 | Partlo et al. | 372/57 X |

*Primary Examiner*—John D. Lee
*Attorney, Agent, or Firm*—John R. Ross, Esq.

[57] ABSTRACT

An excimer laser with optical pulse multiplication. A pulse multiplier optical system receives the laser output beam and produces a multiplier output beam having a larger number of pulses, each with substantially reduced intensity values as compared to the laser output beam. The present invention is particularly important as an improvement to the ArF excimer laser to reduce two-photon absorption damage to optical equipment in lithography machines. For damage mechanisms involving two-photon processes, such as the compaction and solarization of fused silica in the DUV spectral region, a factor of 4 reduction in peak power decreases the quantity of two photon absorption damage done by the synthesized 4-pulse burst by a factor of about 16 compared to delivering all of the energy in the single pulse emitted by the laser. This is a useful method of prolonging the lifetime of very expensive beam delivery systems such as those used in photolithography stepper systems without reducing the total dose available at the wafer. In preferred embodiments, the pulse multiplier system is contained in a module which can be pre-aligned and quickly installed on the excimer laser.

13 Claims, 11 Drawing Sheets

FIG.7
PRIOR ART PULSES

FIG.7A
PRIOR ART PULSE

EXCIMER LASER WITH PULSE MULTIPLIER

FIELD OF THE INVENTION

This invention relates to lasers and in particular to excimer lasers.

BACKGROUND OF THE INVENTION

Prior Art Excimer Lasers

Figure 1:
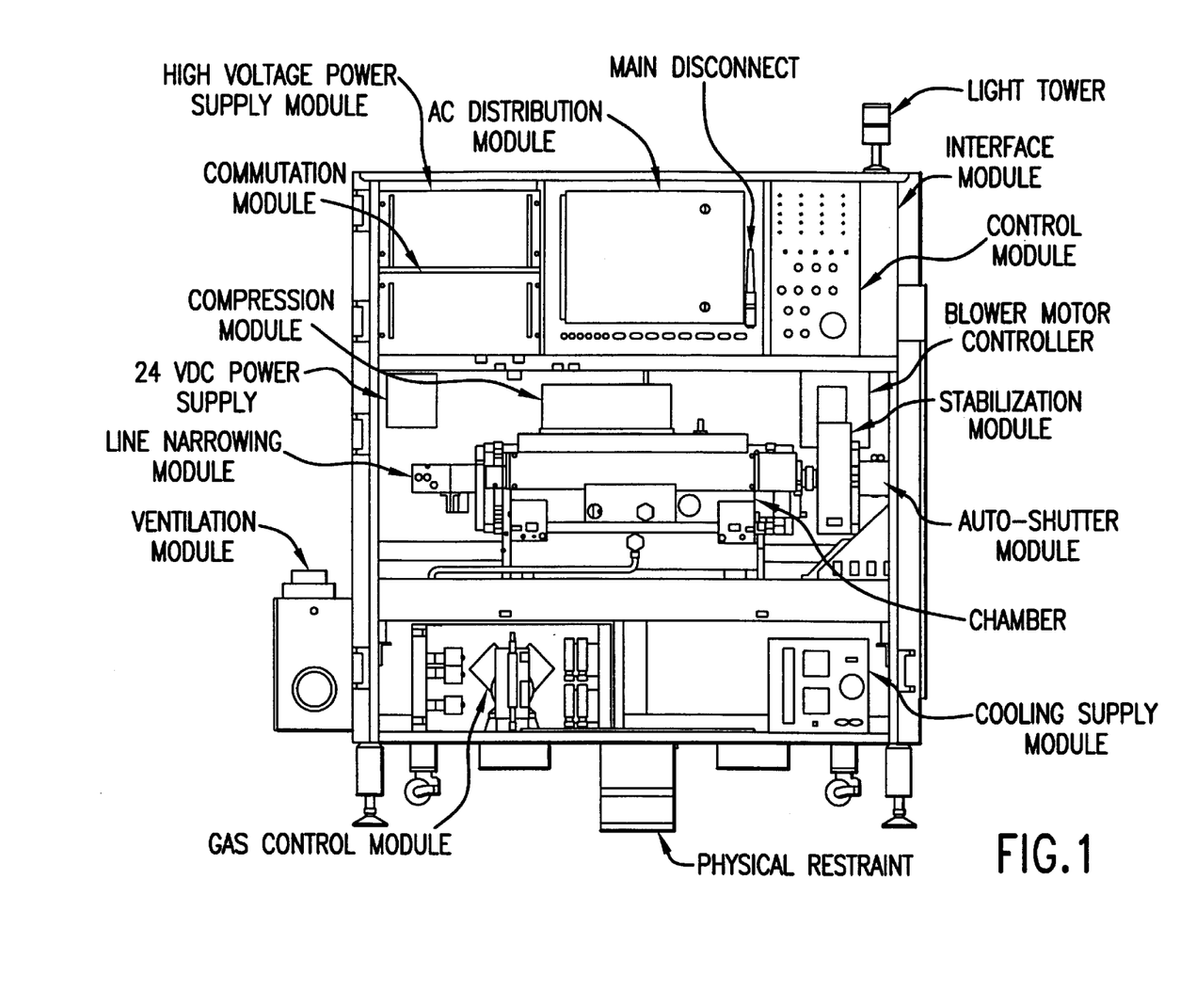
FIG. 1 is a drawing of a state-of-the art modular excimer laser.
Figure 2:
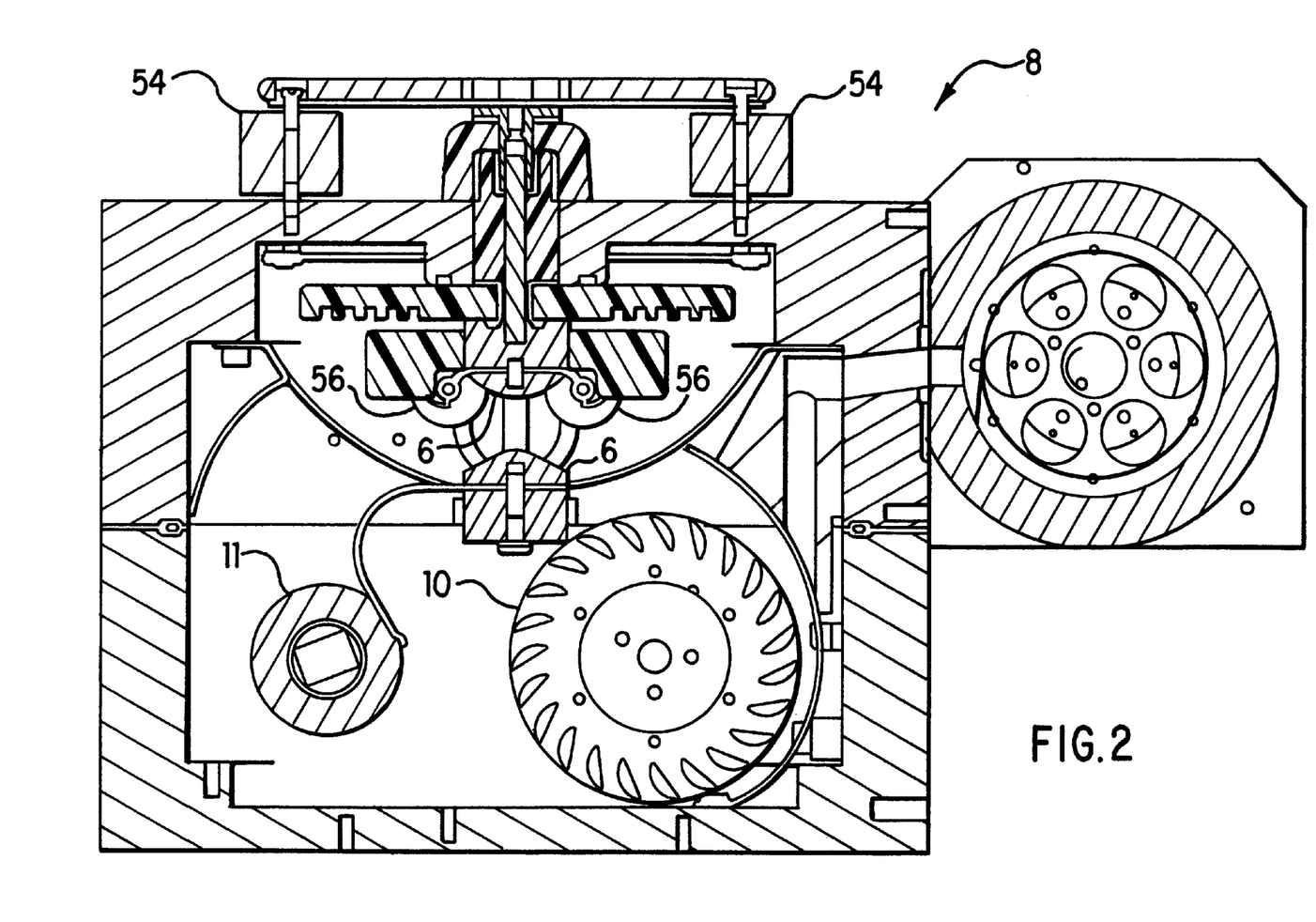

Krypton-Fluoride (KrF) excimer lasers are currently becoming the workhorse light source for the integrated circuit lithography industry. The KrF laser produces a laser beam having a narrow-band wavelength of about 248 nm and can be used to produce integrated circuits with dimensions as small as about 180 nm. Such a KrF laser is described in U.S. Pat. No. 5,023,844 which is incorporated herein by reference. A complete description of a state-of-the art production quality KrF laser is described in U.S. patent application Ser. No. 09,041,474 now U.S. Pat. No. 5,991,324 which is also incorporated herein by reference. The Argon Fluoride (ArF) excimer laser is very similar to the KrF laser. The primary difference is the laser gas mixture and a shorter wavelength of the output beam. Basically, Argon replaces Krypton and the resulting wavelength of the output beam is about 193 nm. This permits the integrated circuit dimensions to be further reduced to about 140 nm. A typical prior art excimer laser used in the production of integrated circuits is depicted in FIG. 1. A cross-section of the laser chamber of this prior art laser is shown in FIG. 2. A pulse power system comprised of a commutator module and a compression module and powered by a high voltage power supply module provides electrical pulses to electrodes 6 located in a discharge chamber 8. Typical state-of-the-art lithography lasers are operated at a pulse rate of about 1000 Hz with pulse energies of about 10 mJ per pulse. The laser gas (for a KrF laser, about 0.1% fluorine, 1.3% krypton and the rest neon which functions as a buffer gas; for an ArF laser, about 0.1% fluorine, 3% argon and the rest neon) at about 3 to 3.5 atmospheres is circulated through the space between the electrodes at velocities of about 25 meters per second. This is done with tangential blower 10 located in the laser discharge chamber. The laser gases are cooled with a heat exchanger 11 also located in the chamber and a cold plate (not shown) mounted on the outside of the chamber. The natural bandwidth of the excimer lasers is narrowed by a line narrowing module as shown in FIG. 1. Commercial excimer laser systems are typically comprised of several modules that may be replaced quickly without disturbing the rest of the system. Principal modules include:

Laser Chamber Module
Pulse Power System with: high voltage power supply module,
commutation module and high voltage compression head module,
Output Coupler Module
Line Narrowing Module
Wavelength Stabilization Module
Control Module
Gas Control Module These and additional modules shown in FIG. 1 are designed for quick replacement as individual units to minimize down time to the laser when maintenance is performed.

Electrodes 6 consists of a cathode and a grounded anode. The anode is supported in this prior art embodiment near the center of the chamber. Flow is counter-clockwise in this view. Peaking capacitor 54 is charged prior to each pulse by pulse power system. During the voltage buildup on peaking capacitor 54 a high electric field is created by two preionizers 56 which produce an ion field between the electrodes and as the charge on the peaking capacitor reaches about 16,000 volts, a discharge across the electrode is generated producing the excimer laser pulse and discharging peaking capacitor 54. Following each pulse, the gas flow between the electrodes of about 2.5 cm per millisecond, created by blower 10, is sufficient to provide fresh laser gas between the electrodes in time for the next pulse occurring 1.0 millisecond later.

In a typical lithography excimer laser, a feedback control system measures the output laser energy of each pulse, determines the degree of deviation from a desired pulse energy, and then sends a signal to the control module to adjust the power supply voltage so that the energy of subsequent pulses are close to a desired energy.

These excimer lasers are typically required to operate continuously 24 hours per day, 7 days per week for several months, with only short outages for scheduled maintenance.

Pulse Multiplication to Avoid Speckle from Coherent Laser Beams

Figure 3:
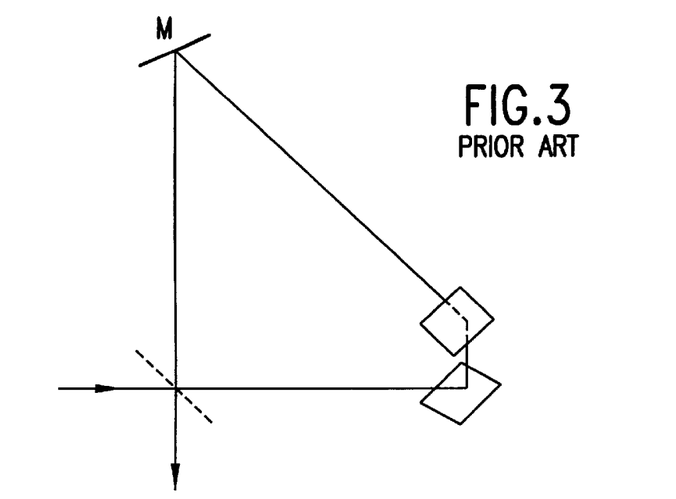
FIGS. 3, 4 and 5 are drawings showing prior art pulse multiplying techniques.

A major advantage of the excimer laser over many other lasers for use as a lithography light source is that the excimer laser beam is naturally very spatially incoherent compared to most other laser sources. Laser beams from other potential lithography laser sources such as a quintupled Nd-YAG is highly coherent and as a result would produce speckle if used for a lithography source. Techniques have been proposed to minimize the speckle produced by pulse beams from these solid state lasers. For example, see U.S. Pat. No. 5,233,460 which is incorporated herein by reference. FIG. 3 shows a pulse delay technique from U.S. Pat. No. 5,233,460. In this case, the output pulses of a coherent laser beam are split into multiple beams which are each subjected to a different delay and are recombined to greatly reduce the coherence of the beam.

The background section of U.S. Pat. No. 5,233,460 recognizes that excimer lasers have multiple spatial mode characteristics and high average power which make the excimer laser well suited for use in microlithography. The multiple spatial mode characteristic is the feature of the excimer laser which is responsible for the naturally incoherent output beam of the excimer laser.

Another system designed for speckle reduction is described in a patent by Scully ("Laser Target Speckle Eliminator", U.S. Pat. No. 4,511,220, April 1985). Scully's technique is summarized in FIG. 4.

Pulse Multiplication for Communication

Figures 4, 5:
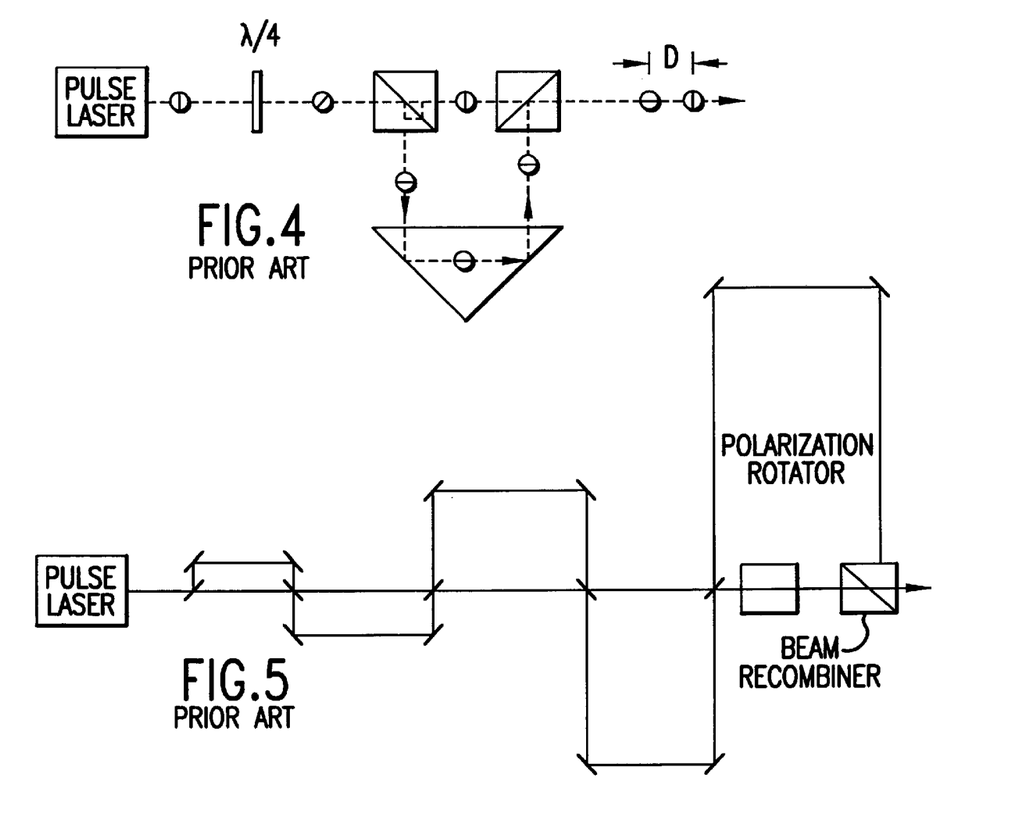

Optical arrangements for multiplying pulses have been proposed for optical communication. The system similar to that shown in FIG. 4 was proposed by Rubenstein in 1969 (C.B. Rubenstein, "Optical Pulse Generator", U.S. Pat. No. 3,430,048) for increasing data transmission rates. Another pulse multiplying system designed for use in communication was proposed by De Lange (E. 0. DeLange et al., "Optical Pulse Multiplexer", (U.S. Pat. No. 3,447,856, June 1969) and an example of one of his techniques for multiplying the number of pulses by 32 is shown in FIG. 5.

Another example of optical pulse multiplexer systems designed for optical communication is described in a patent by Herriott and Schulte (U.S. Pat. No. 3,501,222).

What is needed is a reliable production quality excimer laser capable of producing high energy with low intensity pulses to reduce damage to optics in beam delivery and imaging systems such as those used in optical lithography steppers.

SUMMARY OF THE INVENTION

The present invention provides an excimer laser with optical pulse multiplication. A pulse multiplier optical system receives the laser output beam and produces a multiplier output beam having a larger number of pulses, each with substantially reduced intensity values as compared to the laser output beam.

The present invention is particularly important as an improvement to the ArF excimer laser to reduce two-photon absorption damage to optical equipment in lithography machines. For damage mechanisms involving two-photon processes, such as the compaction and solarization of fused silica in the DUV spectral region, a factor of 4 reduction in peak power decreases the quantity of two photon absorption damage done by the synthesized 4-pulse burst by a factor of about 16 compared to delivering all of the energy in the single pulse emitted by the laser. This is a useful method of prolonging the lifetime of very expensive beam delivery systems such as those used in photolithography stepper systems without reducing the total dose available at the wafer. In preferred embodiments, the pulse multiplier system is contained in a module which can be pre-aligned and quickly installed on the excimer laser.

BRIEF DESCRIPTION OF THE DRAWINGS

FIG. is a cross section drawing showing a section of the laser chamber of the FIG. 1 laser.

FIG. 11 A shows the results of the FIG. 11 embodiment.

DETAILED DESCRIPTION OF PREFERRED EMBODIMENTS

Preferred embodiments of the present invention can be described by reference to the figures.

The 193 nm wavelength of the ArF laser is near the practical, short-wavelength limit of the transmission window in common optical materials used with ultraviolet light in the process of integrated circuit lithography. The high energy of the ArF laser photon (6.4 eV) also increases the probability of nonlinear, two-photon absorption processes. The alkaline-earth fluorides, such as $CaF_2$ and $MgF_2$, as well as fused silica, all have band gaps greater than 6.4 eV and are thus good candidates for ArF optics at moderate intensities, but are subject to two-photon absorption damage at higher intensities. Both linear and nonlinear absorption processes at 193 nm limit the lifetime of UV optics in both the excimer laser and the lithography exposure tool.

For state-of-the art 10 mJ ArF excimer lasers, the dominant excimer laser beam fused silica absorption is not through the linear absorption coefficient $a_0$ but through two-photon absorption. Two-photon absorption is the initial step for the formation of color centers (solarization) and compaction (in $SiO_2$), although the processes leading to these two effects are different. The two-photon absorption process is nonlinear, increasing as the square of the laser power intensity ($W/cm^2$), because the process requires the presence of two photons simultaneously in the vicinity of the absorbing atom. The probability of two photons being at the same place (i.e., the reaction space associated with a particular atom), at the same time is proportional to the laser beam intensity squared (as measured in $watts/cm^2$ or $photons/second\ cm^2$, since the probability of each of the two photons being in the reaction space increases linearly with the intensity.

Four X Pulse Multiplier

Figure 6:
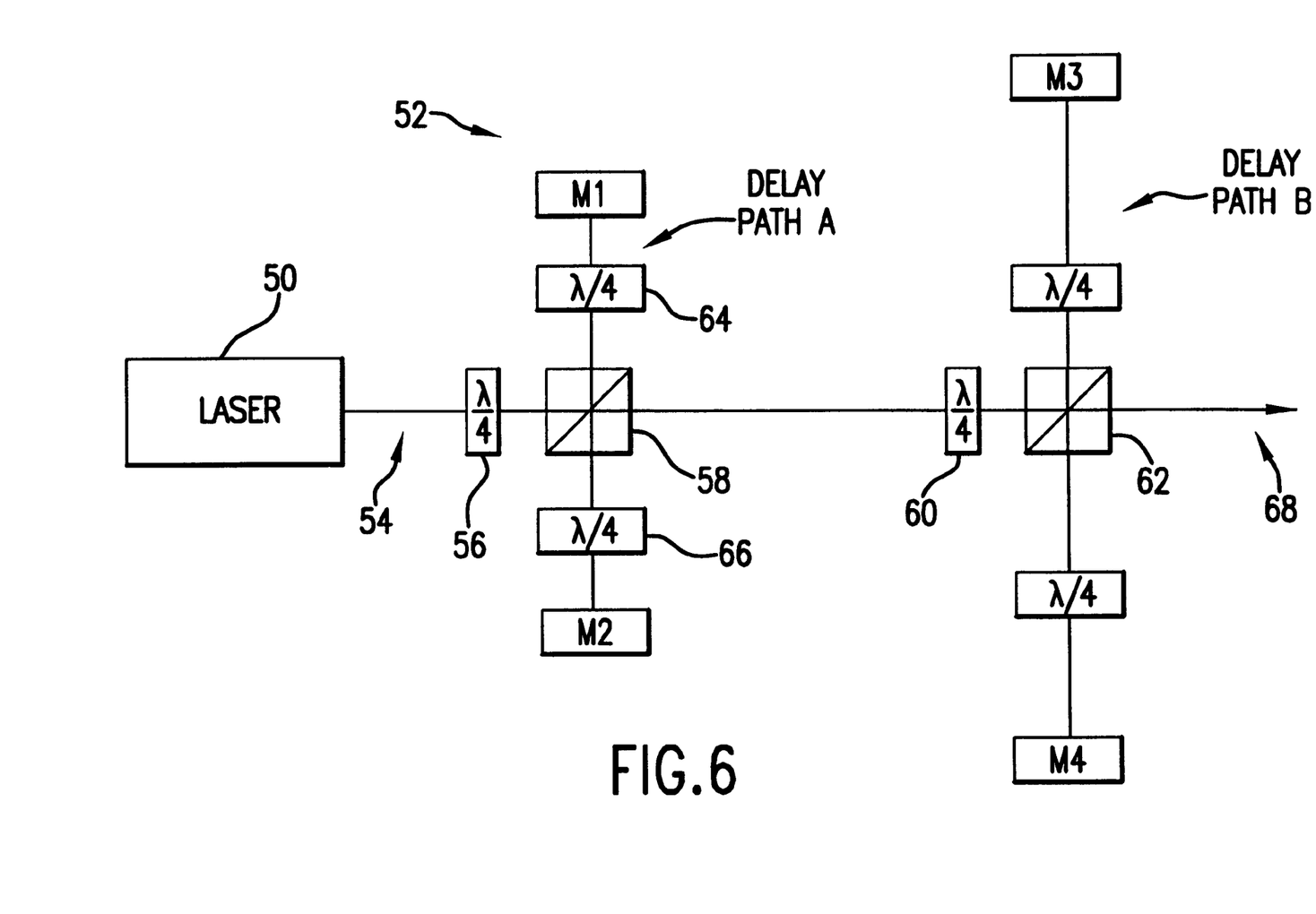
FIG. 6 is a sketch describing the pulse multiplying principals of a preferred embodiment of the present invention.

FIG. 6 shows an optical schematic of a first preferred embodiment of the present invention. This is a low loss optical pulse multiplier 52 which quadruples the effective pulse repetition rate of the ArF laser source 50 without significantly reducing the total energy throughput. All pulses leaving the multiplexer propagate along the same beam line with near-perfect overlap.

ArF laser 50 emits plane-polarized light at a wavelength of 193 nm and at a pulse repetition rate of 1000 Hz. A typical beam cross-section is about 0.3 cm×1.3 cm or about 0.39 $cm^2$. The pulse energy is about 10 mJ. The number of 193 nm photons in each pulse, therefore, is about $1\times10^{16}$ photons which are spread across the beams 0.39 $cm^2$ cross section. A typical ArF pulse, as displayed in FIG. 7A has a duration of about 40 ns which gives it a spatial length of about 12 meters. There, the pulse defines a spatial volume of about 468 $cm^3$ within which these $10^{16}$ photons are traveling. Because the spatial distribution of photons across the cross section of the beam in the horizontal and vertical directions varies by about 30 to 40 percent and because of the temporal variation in intensity generally as indicated in FIG. 7A, the peak density is roughly 2 to 4 times the average density.

With ArF 6.4 eV photon densities in the range of $10^{13}10^{14}/cm^3$, two photon absorption in UV optics is very significant. Two photon absorption can be reduced by either spreading the pulse spatially or temporally. Spatial spreading of the beam means larger optics and this invention does not deal with this alternative. The pulse can be spread temporally by changes in the design of the laser to extend the duration of the discharge, and this invention also does not deal with this alternative. This invention permits a passive temporal optical spreading of the pulse.

The plane of polarization of the ArF laser beam 54 is horizontal, and therefore "P" with respect to the first polarizing beamsplitter it encounters. A first quarter wave plate 56, inserted between the laser and a first beamsplitter 58 converts the polarization state to circular. One half of the light, the "P" component, passes through 50/50 polarizing beamsplitter 58 with no loss other than the scatter and absorption associated with this optical element. The other half of the light, the "S" component, is reflected into the first, or "A" delay path.

Returning to the "P" component, which has passed through first beamsplitter 58 undelayed, the next optic encountered is a second quarter wave plate 60 which converts the polarization of the light to circular, and then a second 50/50 polarizing beamsplitter 62, oriented the same way as the first one so it reflects one half of the light into delay path B. One half of the "P" polarized light passes straight through this second beamsplitter. This is the first sub-pulse in a burst of 4 sub-pulses to exit the pulse multiplier.

At beamsplitter 58, the "S" component is reflected into delay path "A". After making two passes through a third quarter wave plate 64, reflected by the mirror M1, it is converted to "P", which passes through the first beamsplitter 58. The rest of the delay path "A" contains another mirror, M2, and a fourth quarter wave plate 66, which returns the light to the original path, but now as "S" polarization. Delay path "A" adds sufficient path length to partially or completely separate the arrival times of pulses #1 and #2 at the sample location. The #2 pulse has "S" polarization as originally defined and is reflected toward quarter wave plate 60 which converts the polarization state to circular. Again, one half of this light exits the multiplexer with no further delay.

Figure 6A:
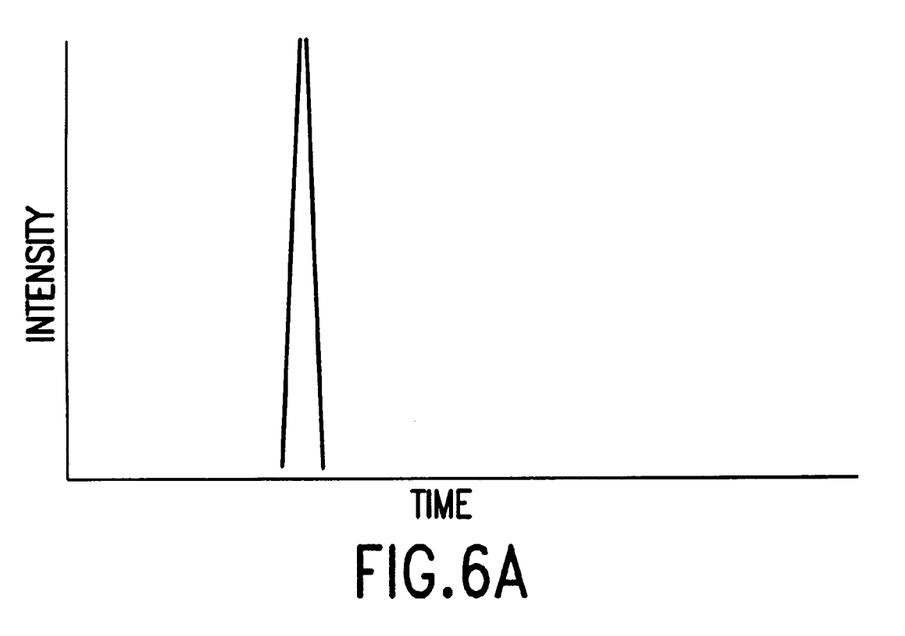
FIGS. 6A and 6B are graphs showing the effects of pulse multiplication

Both pulses #1 and #2 send one half of their light to delay path "B" because of the quarter wave plate located ahead of the third beamsplitter. Delay path "B" has about twice the path length of delay path "A". These further-delayed pulses become sub-pulses 3 and 4. The mirrors M3 and M4 and the two quarter-wave plates in delay path "B" perform the same functions as their counterparts in delay path "A". This sequence is repeated for every pulse of the source laser, so that a 4-pulse burst leaves the multiplexer for each single source laser pulse. There is no significant change in the total energy delivered, but the peak powers experienced by any following optical component are greatly reduced. A laser pulse at 54, leaving the laser is depicted qualitatively in FIG. 6A and the four pulses at 68 leaving beamsplitter 62 is depicted qualitatively in FIG. 6B.

Figure 6B:
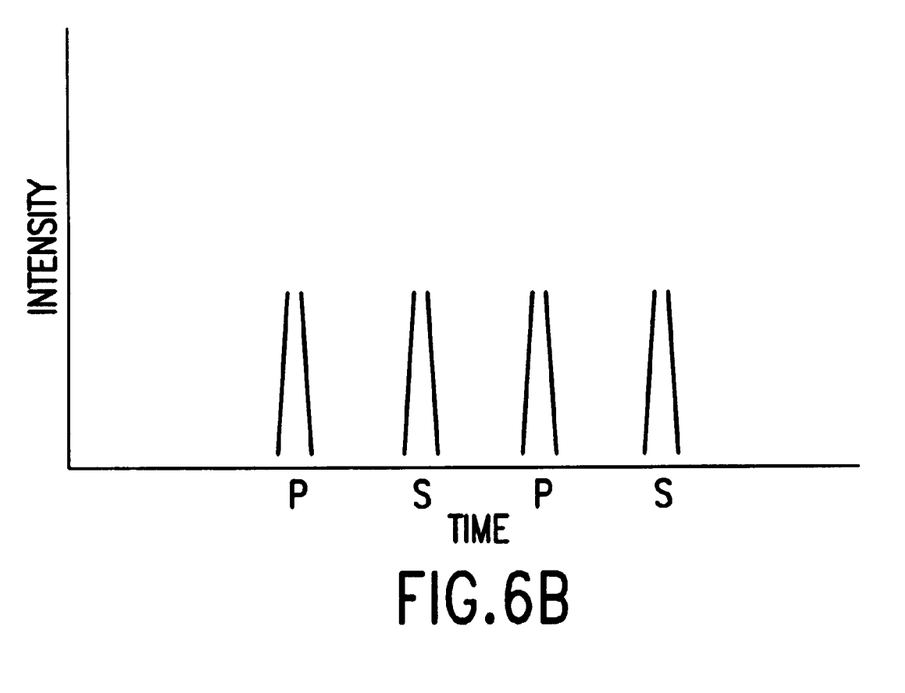

Looking at FIG. 6B, it can be seen that pulses 1 through 4 arrive with alternating "P" and "S" polarizations according to the initial definition. This becomes meaningless for most optical lens systems in which the angles of incidence do not depart from normal by more than, for example, ±20 degrees. For those systems which normally operate with circularly polarized light, another quarter wave plate can be placed at the output of the invention described to convert all of the "S" and "P" pulses to circular polarization.

For a system requiring linear polarized light of one polarization only, a Pockel's cell can be added at the output and temporally switched to convert 2 of the pulses so that all 4 have the same polarization state.

First Preferred Embodiment

Beam Multiplier Module

In a first preferred embodiment of the present invention, a beam multiplier module is attached to a state of the art ArF modular excimer laser used for integrated circuit lithography. The module contains optical components to define a delay path A and a delay path B as described with respect to FIG. 6. Delay path A is shown in FIG. 9A and delay path B is shown in FIG. 9B. Delay path A is about 6 meters, and delay path B is about 12 meters. The 6 meter delay path will produce a temporal delay of about 20 nS, and the 12 meter delay will produce a delay of about 40 nS.

The results are indicated by a comparison of FIGS. 7 and 7A to FIGS. 8 and 8A.

Figure 7:
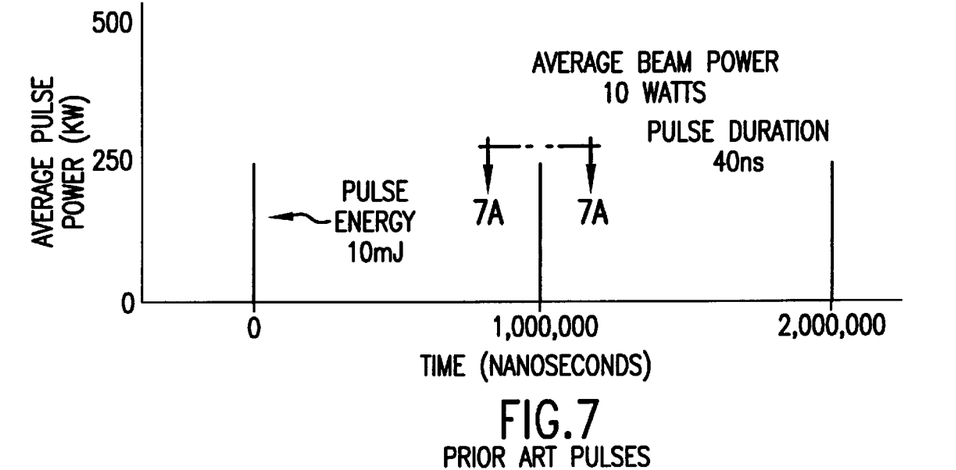
FIGS. 7 and 7A describe the natural pulses of a state-of-the-art ArF excimer laser on time scales of about 2½ milliseconds and about 40 nanoseconds, respectively.
Figure 7A:
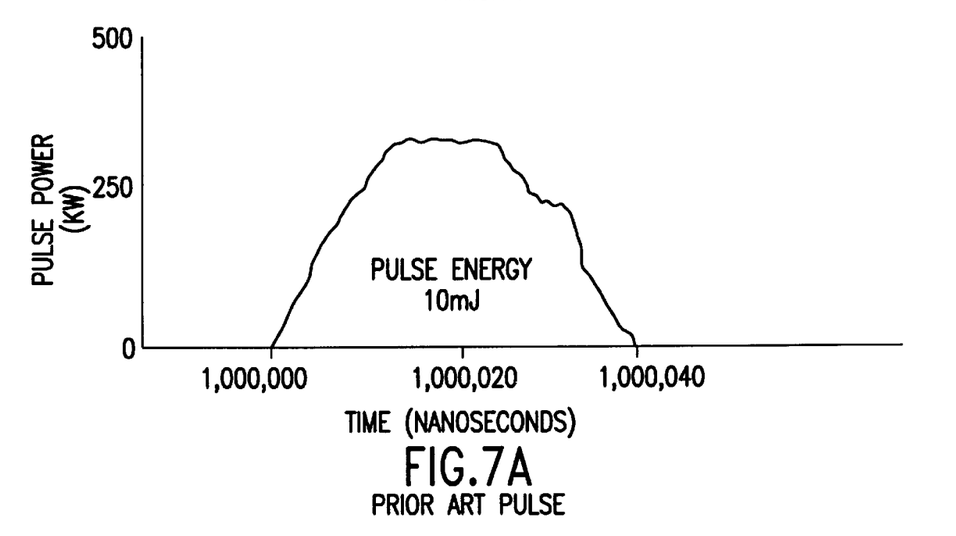

FIG. 7 represents a typical pulse laser beam of a state of the art ArF laser operating at 1000 Hz with 10 mJ pulses. The pulse duration is about 40 nS, and the general temporal shape of a typical single pulse is shown in FIG. 7A. The average pulse power is about 250 kw, and the peak pulse power is about 300 kw. The reader should note that the 40 ns duration pulse (on the 2½ millisecond time scale) appear as three vertical lines on FIG. 7.

Figure 8:
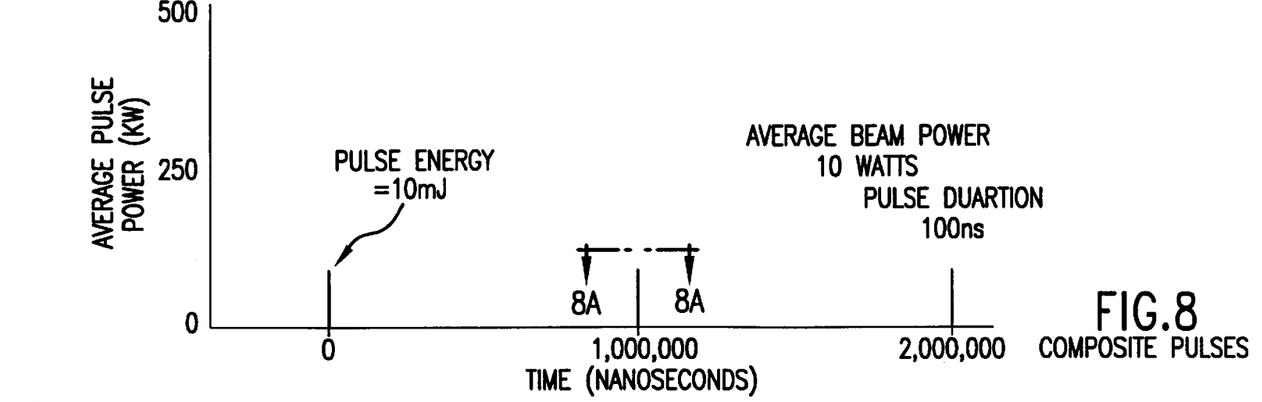
FIGS. 8 and 8A show the results of a preferred pulse multiplication technique.
Figure 8A:
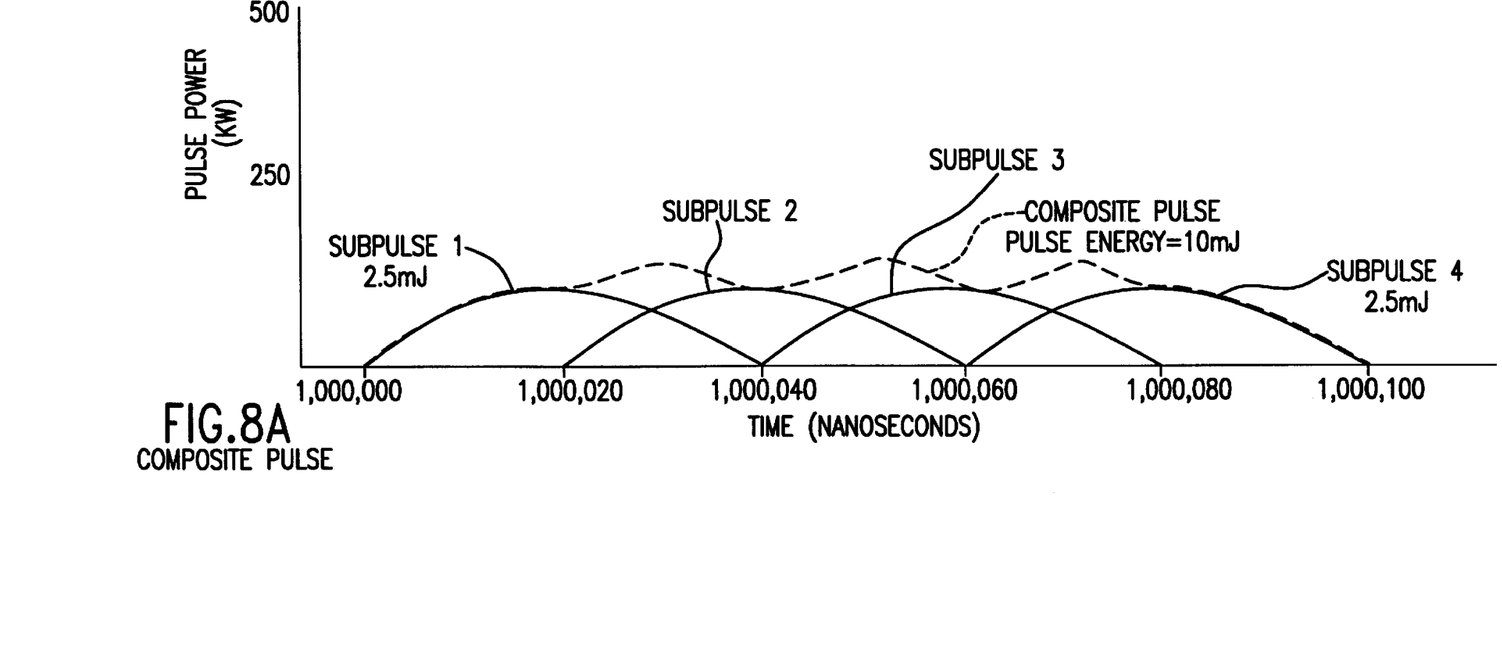
Figure 9:
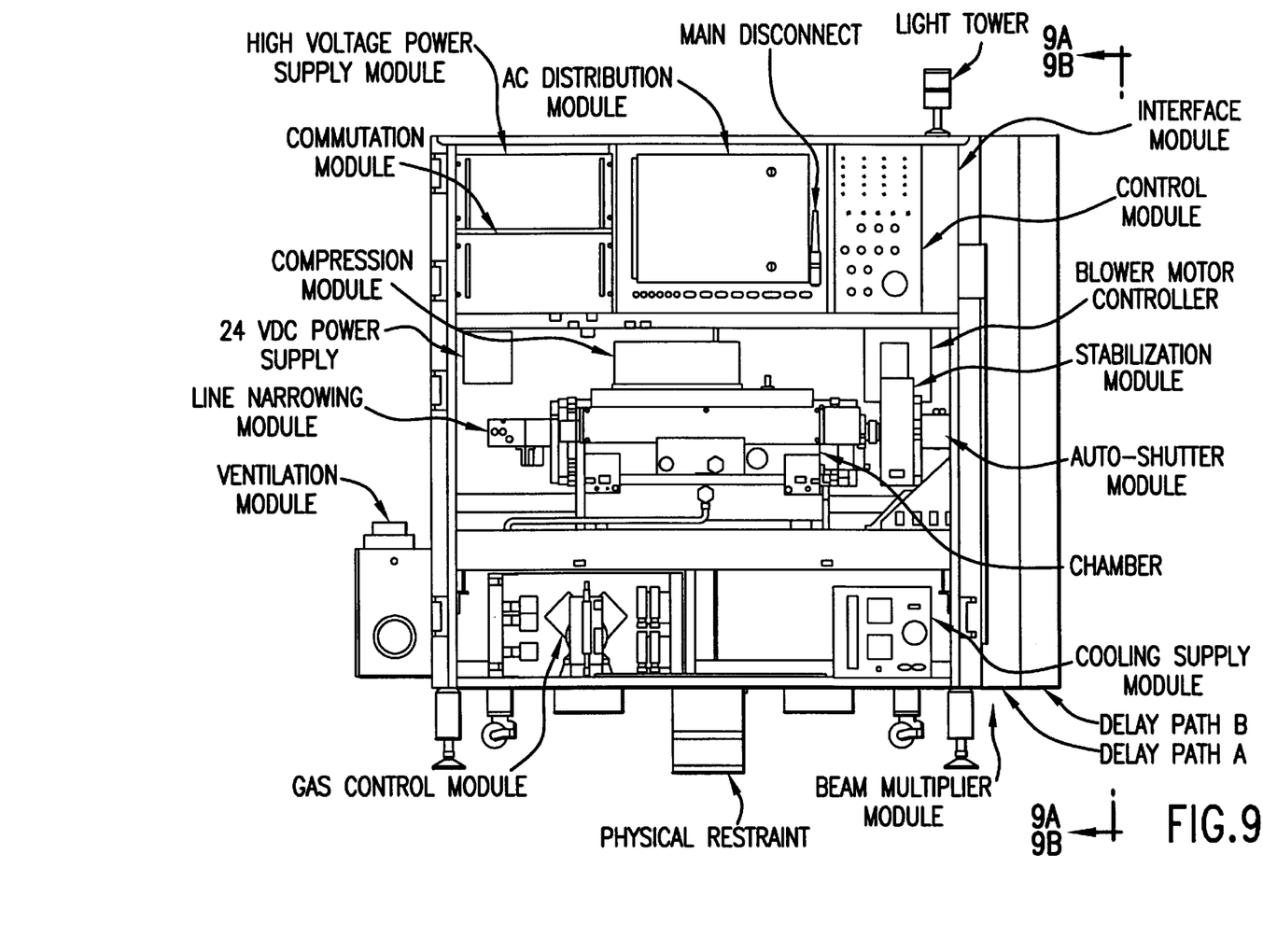
FIG. 9 is a drawing of a state-of-the-art ArF laser with a pulse multiplication module mounted on its output side.
Figure 9A:
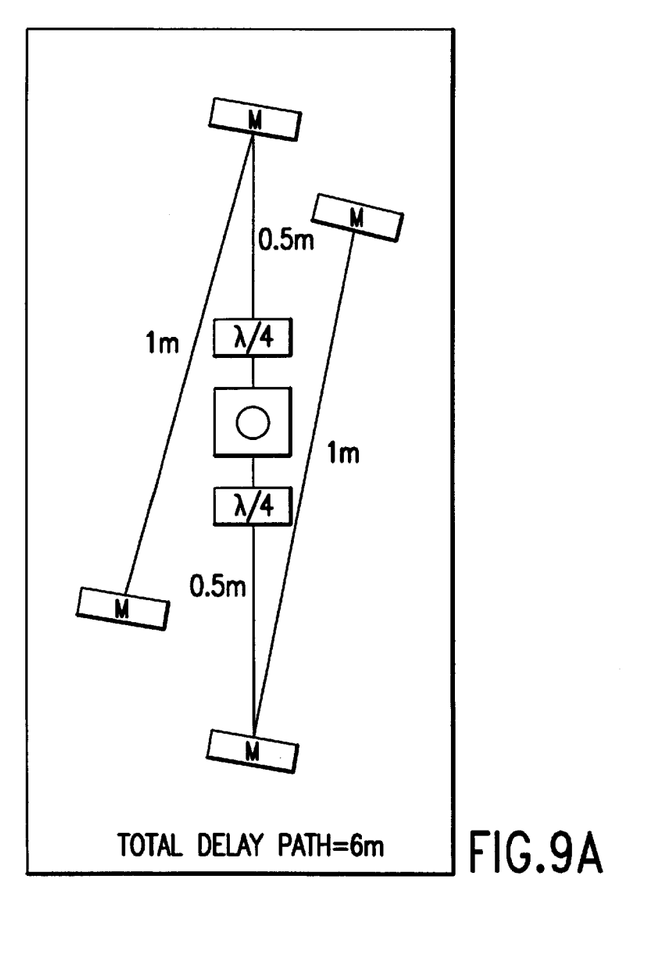
FIG. 9A shows a delay path A of the FIG. 9 embodiment.
Figure 9B:
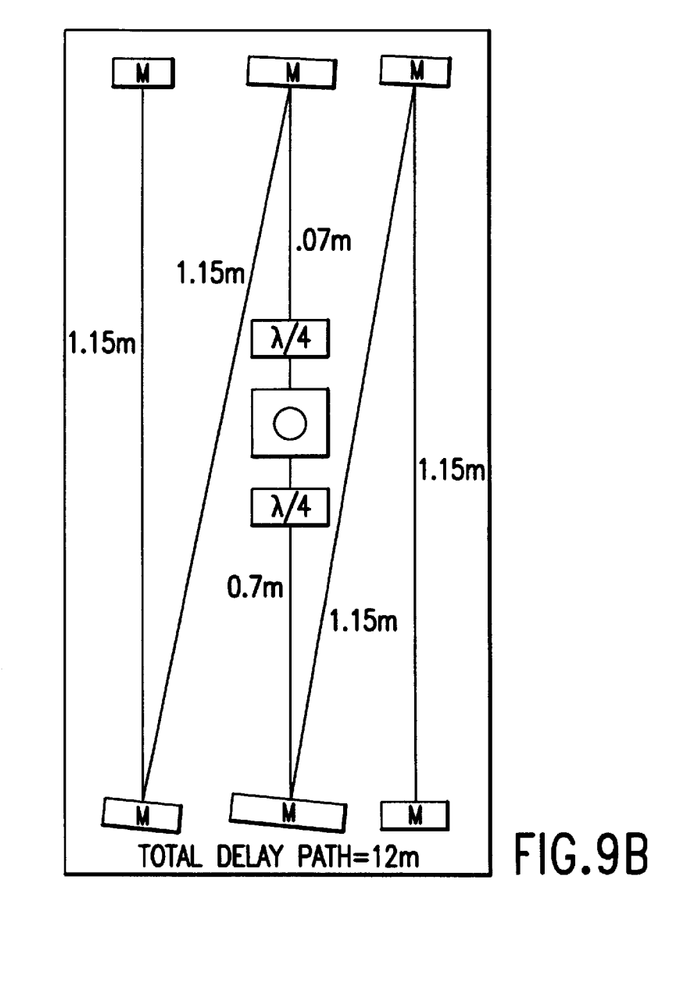
FIG. 9B shows a delay path B of the FIG. 9 embodiment.

FIG. 8A shows four pulses crated by the FIGS. 9, 9A and 9B pulse multiplying module. Sub-pulse 1 appearing at 1,000,000 ns after time zero is not delayed at all as compared to the original pulse. Sub-pulses 2,3 and 4 are delayed 20 nS, 40 nS and 60 ns respectively, and each pulse carries about 2.5 mJ. The four sub-pulses follow the same beam path on exiting the multiplexer and form a composite pulse having substantially all of the energy of the original pulse of 10 mJ, but the pulse is now spread over about 100 ns and the average composite pulse power has been reduced from about 250 kw to 100 kw, and the peak pulse power has been reduced from about 300 kw to about 150 kw.

Second Preferred Embodiment

Figure 10:
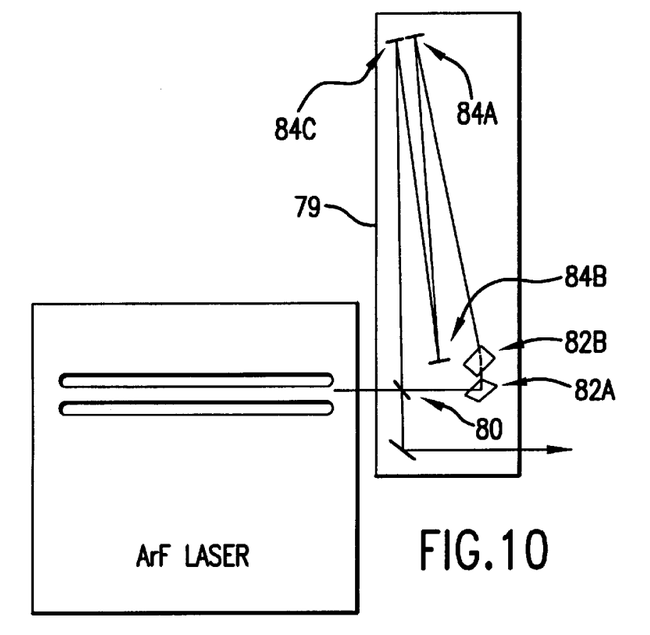
FIG. 10 is a sketch of a second preferred embodiment of the present invention.

In a second preferred embodiment, a pulse multiplying technique similar to that described by Partlo and Oldham in U.S. Pat. No. 5,233,460 for coherence reduction is used in a pulse multiplier module 79 to reduce the intensity of ArF excimer laser pulses. In this embodiment beamsplitter 80 has one surface which is anti-reflection coated and the other surface coated for partial reflectance and partial transmission. We define the reflectance of the beam-splitter as $R_S$ for the S-polarization and $R_P$ for the P-polarization. Likewise for the transmittance: $(1-R_S)$ for the S-polarization and $(1-R_P)$ for the P-polarization.

The stage is aligned such that the laser source is incident with its energy in the P-polarized state. A fraction equal to $R_p$ of the incident energy will be reflected by the beamsplitter which $(1-R_P)$ will pass through the beamsplitter and then on to the 45 degree mirrors. Two 45 degree mirrors 82A and 82B are arranged so that they transmit the beam up and over, changing both its direction of travel and its polarization relative to its direction of travel. The beam is then incident on three normal mirrors 84A, 84B and 84C directing it back to beamsplitter 80 after a total delay path of about 30 feet to provide a 30 ns pulse delay.

After making a full traversal of the delay arm, the pulse encounters the beamsplitter again, but this time in the S-polarization state, and thus $S_S$ will be reflected which $(1-R_S)$ will be transmitted and travel along the same path as the original reflected fraction. At this point there remains $(1-R_P)R_S$ of the original laser pulse energy inside the delay arm. This energy is again rotated by the two 45 degree mirrors and travels via the normal mirror back once again to the beamsplitter. The polarization has now returned to the P state and thus the beamsplitter will transmit $(1-R_P)$ of this energy.

Three individual pulses have now been created by this stage, two with P-polarization and one with S-polarization. Assuming zero losses inside the delay arm, these three pulses will have the following fractions of the original pulse energy:

sub-pulse #1 (P-polarized): $R_p$ sub-pulse #2 (S-polarized): $(1-R_P)(1-R_S)$ sub-pulse #3 (P-polarized): $(1-R_P)R_S(1-R_P)$.

Figure 10A:
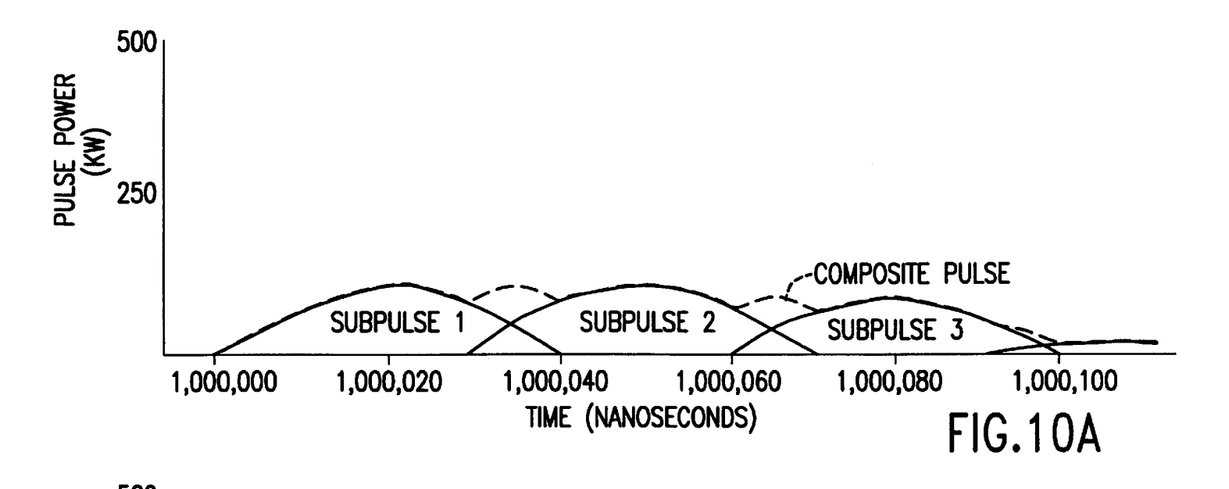
FIG. 10A shows the results of the FIG. 10 embodiment.

Ideally we would like these three sub-pulses to be equal. Since there are three separate quantities and only two independent variables, $R_P$ and $R_S$ we can only hope to minimize the difference between the three sub-pulses. The minimum difference is obtained with a value of $R_P$=0.29 and $R_S$=0.59. FIG.10A shows an approximation of the laser pulse intensity versus time at the output of a single multiplier stage using $R_P$=0.29 and $R_S$=0.59, with the input pulses similar to the typical ArF 10 mJ laser pulse shown in FIG. 7A. Note that sub-pulse 1 is P-polarized, sub-pulse 2 is S-polarized and sub-pulse 3 is P-polarized. The pulse has a long tail representing about 12 percent of the total pulse energy.

Third Preferred Embodiment

Figure 11:
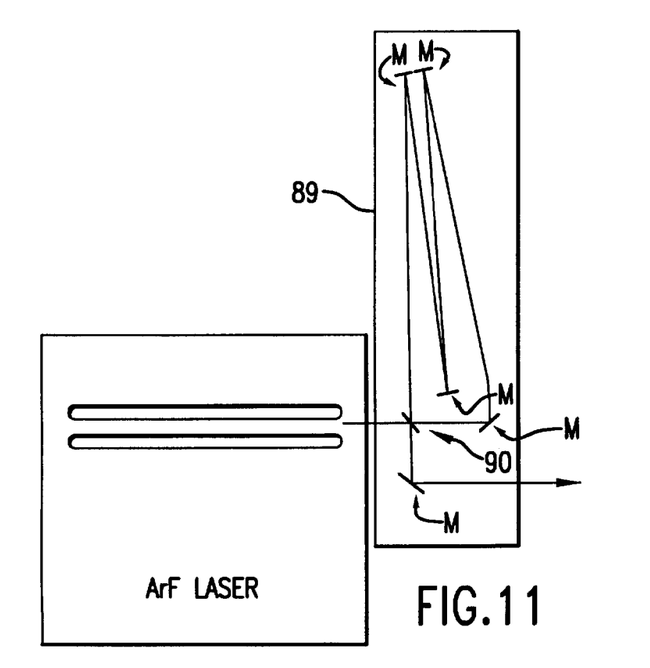
FIG. 11 is a sketch of a third preferred embodiment of the present invention.
Figure 11A:
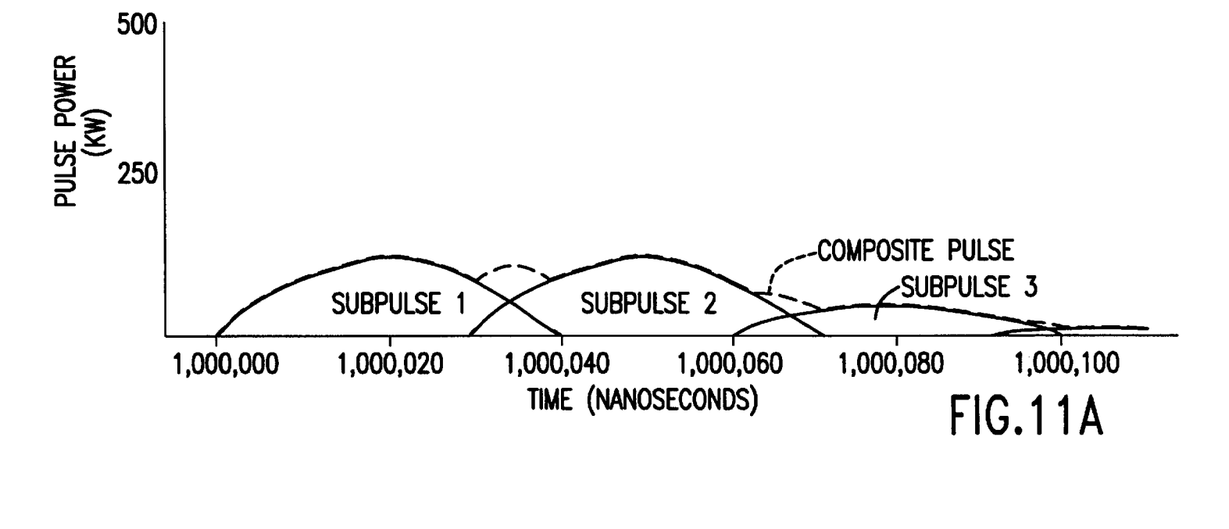

A third preferred embodiment of the present invention is shown in FIG. 11. This embodiment is substantially the same as the one described above except the polarization of the beam is not rotated. The multiplier module 89 comprises a beamsplitter 90 and five total reflection mirrors. Beamsplitter 90 is a reflective-transmissive beam splitter and is chosen to reflect 38 percent to the horizontally polarized light exiting the ArF laser as sub-pulse 1 and to transmit about 62 percent of the beam which, as above, is delayed 30 ns before it returns to beamsplitter 90. Again 62 percent of the originally transmitted 62 percent portion (or 38 percent of the original beam) is transmitted as sub-pulse 2 and about 24 percent of the original beam is reflected again so that the third sub-pulse transmitted through beamsplitter 90 is delayed 60 ns and represents about 15 percent of the original beam. Similarly, the fourth sub-pulse is delayed relative to the first pulse by 90 ns represents about 5 percent of the original pulse. A sketch of the sub-pulse and the composite beam is shown in FIG. 11A. This embodiment also has a long tail on the pulse. Note that this long, gradually shrinking tail could be trimmed with a fast pulse trimmer of the type disclosed in U.S. patent application Ser. No. 08/897,665 (now U.S. Pat. No. 5,852,621), which is incorporated herein by reference. This would permit very precise pulse energy control.

Installing and Aligning

Preferably the beam multiplier module is installed on the output side of the laser as indicated in FIG. 9. A preferred installation would utilize three pins aligned in a triangular pattern and three alignment bolts aligned in a triangular pattern interspersed with the pins in order to provide angular adjustment of the beam multiplier optics in relation to the laser optics.

Persons skilled in the art will recognize that many other embodiments of the present invention are possible based on the teachings expressed in the above disclosure.

Therefore, the reader should determine the scope of the present invention by the appended claims and their legal equivalents.

We claim:

1. A gas discharge laser system with pulse multiplication comprising:
    A) a gas discharge laser configured to produce a laser output pulse beam at a pulse repetition rate of at least 500 laser output pulses per second, each pulse defining intensity values;
    B) a pulse multiplier optical system arranged to receive said output pulse laser beam and to multiply the number of pulses per second by at least a factor of two so as to produce a single multiplier output pulse beam comprised of a larger number of pulses with substantially reduced intensity values as compared with the laser output pulses, said pulse multiplier optical system comprising:
        (1) at least one polarizing beam splitter and
        (2) at least one delay path.

2. A laser as in claim 1 wherein said pulse multiplier optical system also comprises a first quarter wave plate and said at least one delay path is one delay path comprising two quarter wave plates and two mirrors.

3. A laser as in claim 1 wherein said pulse multiplier optical system comprises two polarizing beamsplitters, two quarter wave plates for converting linearly polarized light to circularly polarized light and two delay paths each path comprising two quarter wave plates and two mirrors wherein said beamsplitters, said quarter wave plates and said mirrors are configured to convert each of said laser output pulses into four multiplier output pulses, two of which are "P" polarized and two of which are "S" polarized.

4. A laser as in claim 3 and further comprising an additional quarter wave plate arranged to convert said "P" polarized output pulses and said "S" polarized output pulses with circular output pulses.

5. A laser as in claim 1 wherein said at least one polarizing beam splitter is a single reflective-transmissive beam splitter aligned with said laser output pulse beam so as to transmit a portion of said laser output pulse beam in a first direction and to reflect a portion of said laser output pulse beam in a second direction.

6. A laser as in claim 5 wherein said pulse multiplier optical system further comprises a two-mirror polarization rotator.

7. A laser as in claim 6 wherein said two-mirror polarization rotator is aligned to receive the transmitted portion of said laser output pulse beam, rotate its polarization about 90 degrees and to redirect the rotated beam via a reflecting element to said beam splitter so as to intersect said beam splitter in said second direction.

8. A laser as in claim 5 wherein said pulse multiplier comprises two optical reflectors aligned to reflect a transmitted portion of said laser output pulse beam back to said beam splitter so as to intersect said beam splitter in said second direction so that the portion is partially transmitted in said second direction and partially reflected in said first direction.

9. A laser as in claim 1 wherein said pulse multiplier optical system is contained in a module removably attached to said laser.

10. A laser as in claim 9 wherein and further comprising a module alignment means for optically positioning and aligning said pulse multiplier optical system with the laser output pulse beam.

11. A laser as in claim 10 wherein said alignment means comprises three (3) pins and three (3) alignment bolts.

12. A laser as in claim 1, wherein said laser is configured for use as an optical source for a lithography machine and said pulse multiplier system is located on or near said lithography machine.

13. A laser as in claim 12 wherein said pulse multiplier system is contained in a module removably attached to said lithography machine.

* * * * *